(12) United States Patent
Ishida

(10) Patent No.: US 6,492,752 B2
(45) Date of Patent: Dec. 10, 2002

(54) AC GENERATOR FOR VEHICLE

(75) Inventor: Hiroshi Ishida, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/810,179

(22) Filed: Mar. 19, 2001

(65) Prior Publication Data

US 2001/0022477 A1 Sep. 20, 2001

(30) Foreign Application Priority Data

| Mar. 17, 2000 | (JP) | 2000-075301 |
| Apr. 27, 2000 | (JP) | 2000-127389 |
| Dec. 6, 2000 | (JP) | 2000-371318 |

(51) Int. Cl.$^7$ .............................................. H02K 5/22
(52) U.S. Cl. ..................... 310/71; 310/67 R; 310/89; 439/910
(58) Field of Search ................. 310/67 R, 71, 310/89, 263, 66; 439/488, 489, 315, 910

(56) References Cited

U.S. PATENT DOCUMENTS 5,586,917 A * 12/1996 Yagi et al. ................ 439/488
5,710,467 A   1/1998 Irie et al.
5,903,073 A   5/1999 Mukai
5,977,669 A  11/1999 Yoshida et al.
6,060,802 A   5/2000 Masegi et al.

FOREIGN PATENT DOCUMENTS

| JP | 7-39110    | 2/1995  |
| JP | 9-135558   | 5/1997  |
| JP | 10-56759   | 2/1998  |
| JP | 11-164518  | 6/1999  |
| JP | 1088906    | 10/2000 |

* cited by examiner

Primary Examiner—Burton S. Mullins
(74) Attorney, Agent, or Firm—Oliff & Berridge, PLC

(57) ABSTRACT

An AC generator for a vehicle has a cover and a connector to be connected with an end connector from a vehicle mounted circuit. The connector and the end connector have a lock mechanism using a lock portion and a lever. The cover has an opening for providing a visual accessibility on the lock mechanism. The opening allows to check the lock portion on the connector after the cover is installed and the lever on the end connector even after the end connector is connected with the connector.

18 Claims, 4 Drawing Sheets

L < R

AC GENERATOR FOR VEHICLE

CROSS REFERENCE TO RELATED APPLICATION

This application is based on Japanese Patent Application No. 2000-75301 filed on Mar. 17, 2000, No. 2000-127389 filed on Apr. 27, 2000 and No. 2000-371318 filed on Dec. 6, 2000, the contents of which are incorporated herein by reference.

BACKGROUND OF THE INVENTION

1. Field of the Invention

The present invention relates to an AC generator for a vehicle such as a passenger vehicle and a truck. Specifically, the present invention prefers to an alternator for a vehicle.

2. Description of Related Art

FIG. 5 shows a conventional arrangement of an alternator for a vehicle. The alternator 1 has a frame 4 supporting a rotor and a stator. The frame 4 also supports a rectifier 5 and regulator 8 on a rear side of the alternator 1.

The regulator 8 regulates an output voltage of the alternator by controlling a field current. The regulator 8 has a case 81, an electric circuit (not shown), and an axially protruding and axially opening connector 82 integrally formed with the case 81. The connector 82 is connectable with an end connector (not shown) extending from a vehicle-mounted circuit. The connector 82 and the end connector have a lock mechanism. The connector 82 has a lock portion 83 disposed on an outside wall of the connector 82. The lock portion 83 is a wedge shaped projection on which a resilient arm portion on the end connector is locked when the end connector is connected with the connector 82.

The rectifier 5 and the regulator 8 are protected and covered with a cover 6 mounted on the frame 4 by stud bolts 10 and nuts 9. The cover 6 has a window 61 for permitting a connection between the connector 82 and the end connector. The cover 6 also has a plurality of cooling windows 63.

SUMMARY OF THE INVENTION

The cover 6 hides the lock portion 83 from view. Therefore, it is difficult to check the lock portion after the cover 6 is fixed. Moreover, at an assembling line of the vehicle or a service shop, a worker cannot see a locking condition of the lock mechanism during a connecting process and after the end connector is connected with the connector.

The present invention addresses these drawbacks by providing an improved arrangement of an AC generator for vehicle.

It is therefore an object of this invention to provide an AC generator for vehicle which provides an easy and secure connection between a connector and an end connector.

It is a further object of this invention to provide an AC generator for vehicle which permits a check of a lock mechanism of a connector.

According to a first aspect of the present invention, a cover provides a visual accessibility on a lock portion of a connector on an AC generator for vehicle. The lock portion can be checked visually.

According to a second aspect of the present invention, a cover has an additional opening area. The additional opening area provides a visual accessibility on a lock portion. The additional opening may be provided by an enlarged opening or an additional independent opening.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
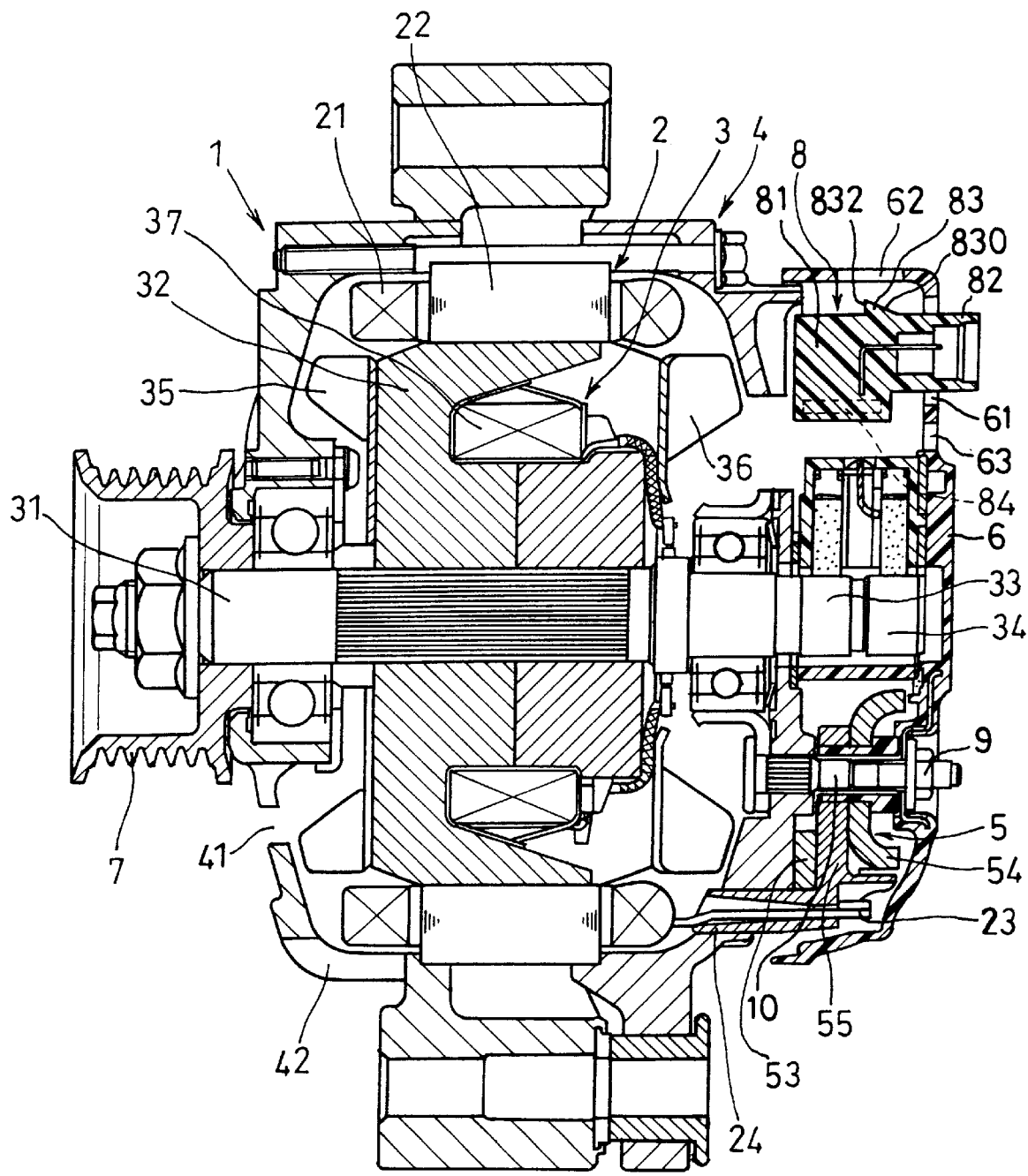
FIG. 1 is a sectional view of an alternator for a vehicle according to a first embodiment of the present invention.

The present invention applied to an alternator for vehicle shown in FIG. 1.

The alternator 1 has a stator 2, a rotor 3 and a frame 4. The frame 4 supports a rectifier 5, a cover 6 and a regulator 8 on a rear side by a plurality of through bolts 10 and nuts 9.

The stator 2 is supported and fixed on the frame 4. The stator 2 has a stator winding 21 and a stator core 22. The stator winding 21 is connected with the rectifier 5 by a connecting lead 23 passing through an insulating tube 24 inserted into a hole formed on a rear side wall of the frame 4.

The rotor 3 is rotatably supported on the frame 4. The rotor 3 has a shaft 31, a Lundel type iron core 32 formed by a combined pair of pole cores, a pair of slip rings 33 and 34, a pair of cooling fans 35 and 36 and a field coil 37. The cooling fans 35 and 36 are centrifugal fans. The cooling fans 35 and 36 are fixed on both sides of the core 32 by a spot welding or the like. A pulley 7 for receiving a rotating force from an engine is fixed on the shaft 31. The frame 4 has a plurality of air inlets 41 and air outlets 42 for the cooling fans 35 and 36.

The rectifier 5 has a negative side fin 53, a positive side fin 54 and a terminal holder 55 integrally formed with the insulating tube 24. The negative side fin 53 and a positive side fin 54 each has a plurality of rectifying elements. The terminal holder 55 holds a plurality of terminals connecting with the stator winding 21 and the rectifying elements.

The regulator 8 has a case 81, a connector 82 and a lock portion 83 as a part of a lock mechanism. The case 81, the connector 82 and the lock portion 83 are formed integrally by a resin. The connector 82 has a plurality of connector pins as a terminal of a circuit unit 84. The case 81 is a member covered with the cover 6.

The regulator 8 is located on a radial outside to a brush unit which has a pair of brushes for the slip rings 33 and 34. The regulator 8 and the brush unit are lined up on a radial direction and mounted on the frame 4. The regulator 8 is apart from the brush unit to provide a cooling air passage between them.

The case 81 accommodates the circuit unit 84 which has an integrated circuit and discrete electric elements. The circuit unit 84 may be an integrated circuit or a conventional printed circuit board. The case 81 may contain only a transistor for switching a field current supplied through the brushes and the slip rings 33 and 34 to the field winding 37.

The connector 82 extends from a radial outside portion of the case 81. The connector 82 extends to reach an outside of the cover 6. The connector 82 extends and opens axially.

Figure 4:
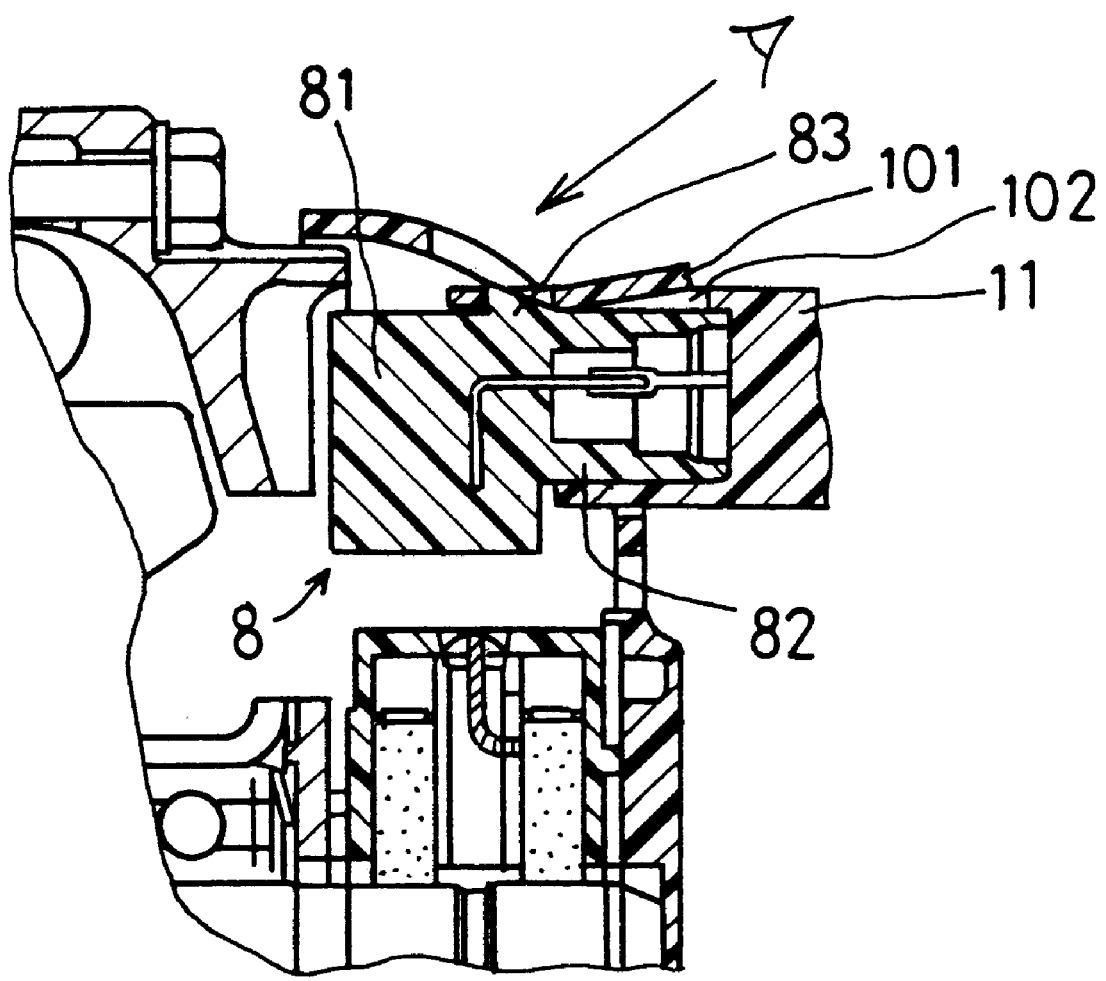
FIG. 4 is a partial sectional view of the alternator showing the connector, the cover and an end connector according to the second embodiment of the present invention.
Figure 5:
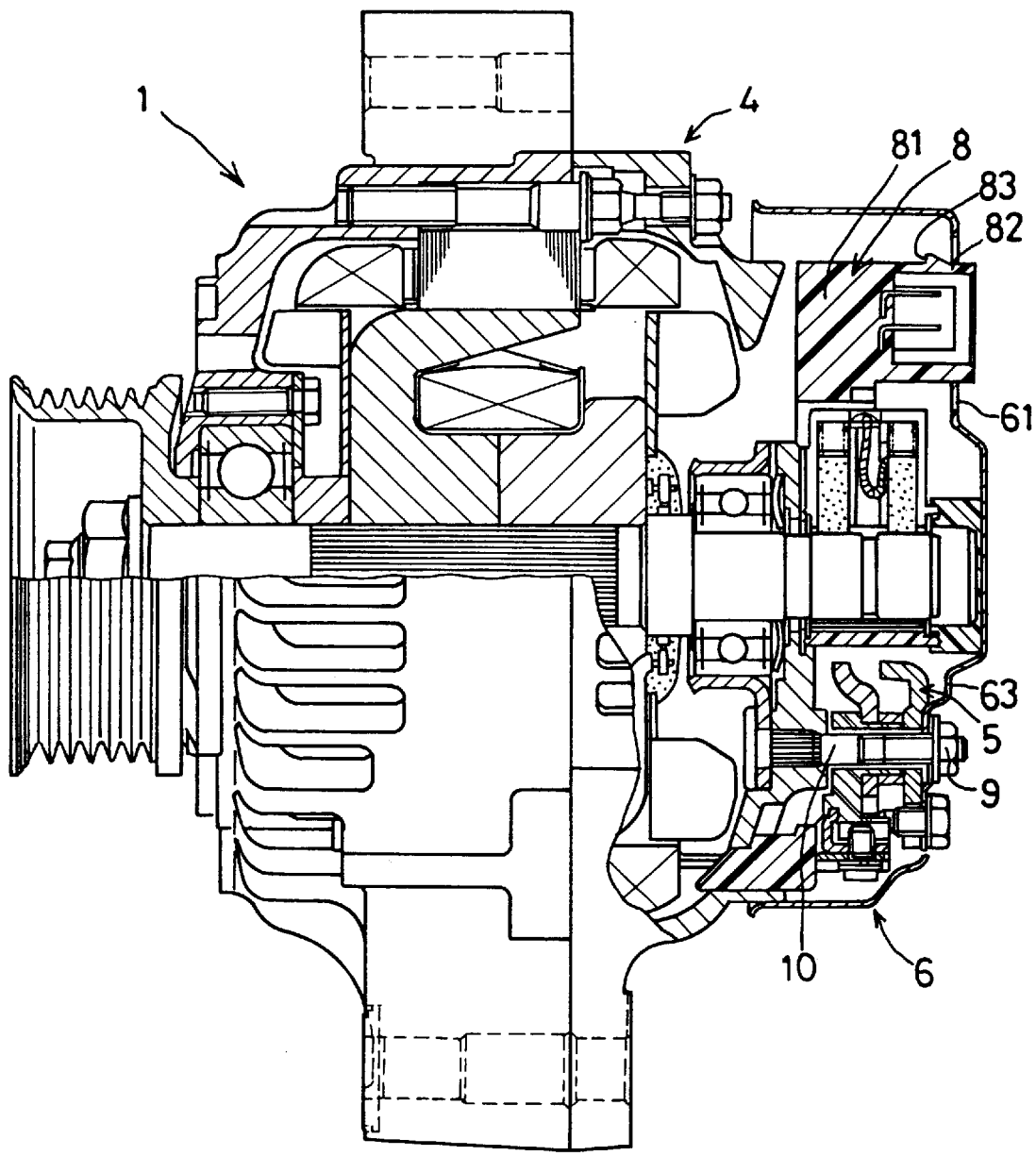
FIG. 5 is a sectional view of an alternator according to a prior art.

The lock portion 83 is located on a radial outside wall of the case 81 and the connector 82. The lock portion 83 is a wedge shaped projection. The lock portion 83 provides a slope 830, a step 832 and both side surfaces. The slope 830 is elevated as it is distanced from an axial end of the connector 82 to receive a resilient arm of an end connector from the vehicle. The end connector is disposed on an end of a wire extended from an electric circuit mounted on the vehicle. The resilient arm is a part of the lock mechanism for locking the connectors. The end connector and the resilient arm may form as shown in FIG. 4. The step 832 locks the resilient arm when the resilient arm reaches to the step 832.

The cover 6 protects electric components, the rectifier 5, the regulator 8 and the brush unit, mounted on a rear side of the alternator. The cover 6 is shaped as a dish with rounded edge except for a portion in which the regulator 8 is accommodated. The cover 6 provides a flat wall on a radial outside to the regulator 8. The cover 6 defines a plurality of openings, a first opening 61 for the connector 82, a second opening for the lock portion 62 and a plurality of third openings 63 for cooling air.

The cover 6 is made of resin, but the cover 6 may made of metal. Further, the cover 6 may be provided by the frame 4 since the frame 4 may protects the electric components when they are installed inside the frame 4 as well as the cover 6. In this arrangement, the openings are formed on the frame 4.

The first opening 61 is located on an axial wall of the cover. The first opening 61 has an opening area slightly larger than the connector 82 to pass the connector 82 through and to receive the end connector. However, the first opening 61 is not enough to provide a sufficient opening area to permit a sufficient visual accessibility on the lock portion 83 after the connector 82 is located in the first opening 61.

The second opening 62 is located on a radial outside wall of the cover 6. The second opening 62 directly faces at least one surface of the lock portion 83. The second opening 62 provides an additional opening area faces perpendicular to an operating direction in which the end connector is operated to connect and disconnect with the connector 82. Therefore, the lock portion 83 is visually accessible from radial outside of the alternator through an opening area of the second opening 62. Further, the lock portions and the lock mechanism, the lock portion 83 and the resilient arm, are visually accessible even after the end connector is connected with the connector 82.

It is preferable that the second opening 62 is located on an upper side when the alternator 1 is mounted on an engine of the vehicle. The connector 82 may extends in a radial direction of the alternator and opens toward a radial outside. Further, the first opening 61 and the second opening 62 may be connected. It is possible to provide an additional opening area by enlarging the first opening 61 beyond the opening area required to receive the connector 82 and the end connector. The openings defined by the cover 6 may reach an outside edge of the cover 6. The cover 6 may be made of transparent material to provide the visual accessibility.

The second opening 62 also acts as a cooling air inlet as well as the third opening 63 and a remaining area of the first opening 61 around the connector 82. An opening area of the second opening 62 is larger than the remaining area of the first opening 61. An opening area of the second opening 62 is larger than each opening area of the third openings 63. The second opening 62 is wide enough in both length and breadth and has a sufficient opening area to permit a visual check of the lock portion 83 and the resilient arm. The third openings 63 are slits which are narrower than the second opening 62. The second opening 62.

In this embodiment, the lock portion 83 can be visually checked even after the cover 6 is installed. Further, the resilient arm of the end connector can be visually checked even after the end connector is connected with the connector 82.

Figure 2:
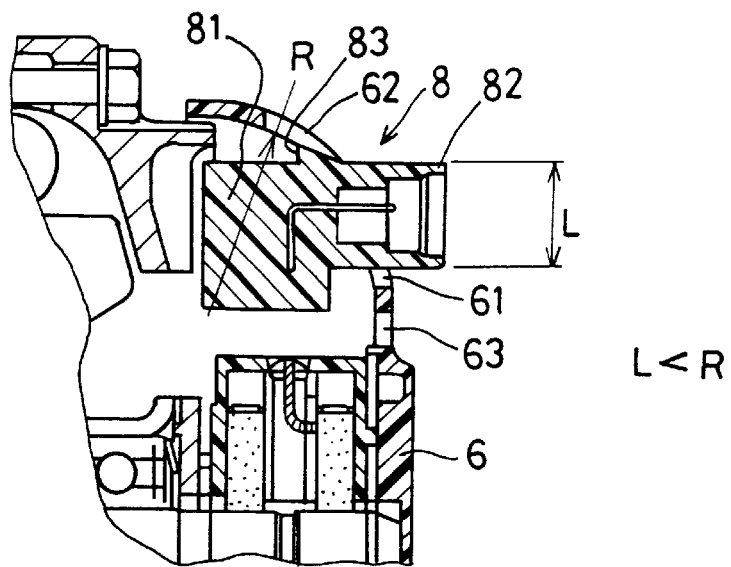
FIG. 2 is a partial sectional view of an alternator showing a connector and a cover according to a second embodiment of the present invention.

FIG. 2 shows a second embodiment of the present invention. The cover 6 is formed as a dish with a curved edge defined by an average radius R. The average radius R is larger than a radial length L of the connector 82. The openings 61 and 62 are integrally formed into a unitary opening. The unitary opening located over an axial wall and a radial wall provides both of opening area as the first opening 61 and the second opening 62. The opening is located at a boundary of the axial wall and the radial wall. Therefore, the lock portion 83 is exposed to an outside of the cover 6.

Figure 3:
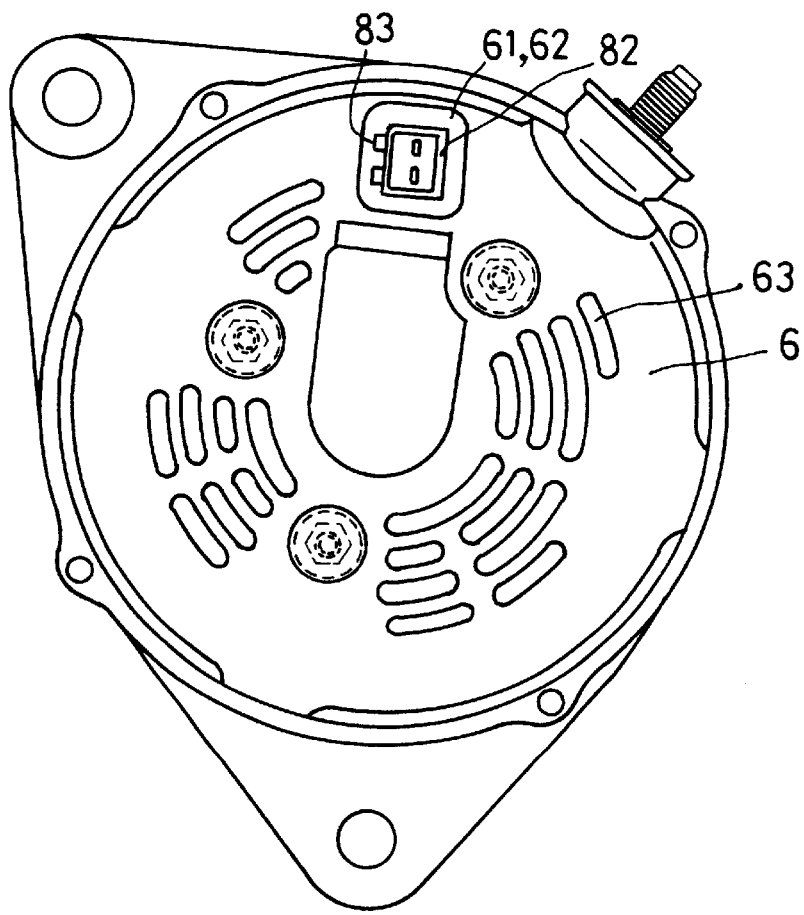
FIG. 3 is a plan view from rear side of the alternator according to the second embodiment of the present invention.

The lock portion 83 maybe located on a circumferential side-wall of the connector 82 as shown in FIG. 3. The opening opens toward a radial outside and faces a side surface of the lock portion 83. The lock portion 83 is still visible from a radial outside.

FIG. 4 shows the end connector 11. The end connector 11 has a lever 101 as the resilient arm. The lever 101 has a hole 102 to receive the lock portion 83 when the end connector is operated to connect with the connector 82 properly. The lever 101 releases the lock portion 83 when the lever 101 is manually operated to lift an end of the lever 101.

As shown in FIG. 4, a lock mechanism having the lock portion 83 and the lever 101 are entirely exposed to a radial outside. Therefore, the lock mechanism of the connectors 82 and 11 are visible from a radial outside of the alternator.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An AC generator for vehicle comprising:
   a connector connectable with an end connector extending from a vehicle-mounted circuit;
   a lock portion for locking the end connector on the connector; and
   a cover disposed to protect the connector, wherein the cover defines an opening for a connection between the connector and the end connector, and provides visual inspection of the lock portion.

2. An AC generator for vehicle as claimed in claim 1, wherein the over has an additional opening area for providing the visual inspection of the lock portion.

3. An AC generator for vehicle as claimed in claim 2, wherein the additional opening area is located radially outside the connector.

4. An AC generator for vehicle as claimed in claim 3, wherein the additional opening area faces perpendicular to an operating direction in which the end connector is operated to connect and disconnect with the connector.

5. An AC generator for vehicle as claimed in claim 3, wherein the additional opening area is provided by an additional opening independent of the opening for the connection.

6. An AC generator for vehicle as claimed in claim 5, wherein the additional opening is located radially outside with respect to the opening for the connection.

7. An AC generator for vehicle as claimed in claim 6, wherein the additional opening is located on a radial wall of the cover.

8. An AC generator for vehicle as claimed in claim 3, wherein the additional opening area is provided by the opening for the connection.

9. An AC generator for vehicle as claimed in claim 8, wherein the opening is located on an axial wall and a radial wall.

10. An AC generator for vehicle as claimed in claim 9, wherein the lock portion is disposed on a side surface of the connector facing a circumferential side of the AC generator.

11. An AC generator for vehicle as claimed in claim 2, further comprises a member covered with the cover, the member including a voltage regulator circuit, the connector and the lock portion being integrally formed with the member, the connector extending along an axial direction of the AC generator, and the additional opening area facing the lock portion and opening toward a circumferential side of the generator.

12. An AC generator for vehicle as claimed in claim 11, wherein the opening and the additional opening are integrally formed on a radial wall and an axial wall of the cover.

13. An AC generator for vehicle as claimed in claim 12, wherein the cover has a larger average radius between the radial wall and the axial wall than a radial length of the connector.

14. An AC generator for vehicle as claimed in claim 13, wherein the lock portion is located inside the cover.

15. An AC generator for vehicle as claimed in claim 14, wherein the additional opening is formed on a place providing visual inspection of the lock portion even when the end connector is connected with the connector.

16. An AC generator for vehicle as claimed in claim 15, wherein the lock portion is formed on the connector or the member.

17. An AC generator for vehicle as claimed in claim 16, wherein the connector is located on a radial outside portion of the member.

18. An AC generator for vehicle as claimed in claim 17, further comprising a frame on which the frame, the connector and the cover are mounted.

* * * * *